United States Patent [19]

Hackbarth et al.

[11] 3,784,442

[45] *Jan. 8, 1974

[54] ALKALI METAL ALUMINO SILICATES, METHODS FOR THEIR PRODUCTION AND COMPOSITIONS THEREOF

[75] Inventors: Lowell E. Hackbarth, Bel Air, Md.; Joseph T. Crockett, Auburn, Ala.

[73] Assignee: J. M. Huber Corporation, Borger, Tex.

[ * ] Notice: The portion of the term of this patent subsequent to June 1, 1988, has been disclaimed.

[22] Filed: July 20, 1972

[21] Appl. No.: 273,673

Related U.S. Application Data

[60] Division of Ser. No. 112,469, Feb. 3, 1971, which is a continuation-in-part of Ser. No. 730,892, May 21, 1968, Pat. No. 3,582,379.

[52] U.S. Cl. .......... 162/181 C, 106/288 B, 162/162
[51] Int. Cl. .............................................. D21h 3/82
[58] Field of Search ....................... 162/181 C, 162; 106/288 B

[56] References Cited
UNITED STATES PATENTS
3,582,379  6/1971  Hackbark et al ............... 106/288 B
2,739,073  3/1956  Bertorelli ....................... 106/288 B Primary Examiner—S. Leon Bashore
Assistant Examiner—William F. Smith
Attorney—Harold H. Flanders

[57] ABSTRACT

The subject matter of the following specification concerns the production of finely divided materials useful as pigments, moisture conditioners, paper fillers, and in rubber reinforcement and the like. Considering present economics, perhaps the most practical embodiment of the subject matter employs the reaction of a soluble sodium silicate and aluminum sulfate in producing precipitates commonly known and identifiable as sodium alumino silicates, the precipitate being ultimately collected as a dried particulate material of sub-micron particle size. The disclosed process involves conducting this general type of reaction in the presence of calculated quantity of sodium sulfate from the outset of the reaction whereby economics are improved and highly refined modifications in the characteristic of the final materials become obtainable. The reaction may be varied according to several conditions, such as pH, temperature, concentration, manner of feeding materials and the like whereby to better adapt the new materials to highly specialized needs, such as in rubber compounding and paper production.

1 Claim, No Drawings

ALKALI METAL ALUMINO SILICATES, METHODS FOR THEIR PRODUCTION AND COMPOSITIONS THEREOF

This is a division of application Ser. No. 112,469, filed Feb. 3, 1971, which is a continuation-in-part of application Ser. No. 730,892, filed May 21, 1968, now U.S. Pat. No. 3,582,379.

BACKGROUND OF THE INVENTION

This invention relates to the production of finely divided materials having a variety of uses such as pigments, moisture conditioners, etc., but which are especially useful as rubber reinforcing materials and in paper making. The pigments of the invention are produced by the reaction of a water soluble alkali metal silicate with water soluble aluminum salts of strong acids, preferably by the reaction of sodium silicates and aluminum sulfate, according to methods generally related to those described in U.S. Pat. No. 2,739,073. The products resulting from the process of this patent, as well as from the similar process of this invention, are, in the sodium form, sometimes described as sodium silico aluminates, sodium alumino silicates, synthetic zeolites, mineral pigments and the like.

SUMMARY OF THE INVENTION

Although the products of the present process are in general much the same in chemical content as those described in the aforementioned patent, they are markedly different in their physical nature and surface chemistry. In particular, it is concluded that they differ as regards to their particle size, the chemical nature of the particle surfaces, and in the nature of the state of aggregation, which characteristics are regarded as of primary interest in the rubber reinforcing class of synthetic silicas and silicates. While the products obtainable according to the aforesaid patent have good utility in rubber compounding and paper making, the markedly different products of this invention are found to be quite superior, at least insofar as at present has been demonstrated in actual practice. More specifically, the new products of the present invention are at least comparable in utility to the present best known rubber filler materials, while also having other valuable improved utility in paper production. Therefore, the new products herein, may be readily distinguished from those of the said patent on the basis of rubber suitability criteria alone, and perhaps better so on such basis since certain highly technical physical properties by which they may be distinguished are at least to some extent speculative. Moreover, the process involved herein is significantly different.

In addition to their improved qualities, the new products are producible at considerable economic advantages over prior similar materials.

As regards to the economic advantages, such are illustrated in relation to the type of products resulting from the process described in U.S. Pat. No. 2,848,346, which products are currently accepted as being highly suitable for rubber compounding. In fact these latter patented products possess the very optimum properties according to current standards. As will be observed upon reference to this patent, products are produced which are referred to as hydrated silicas, (pigments are hydrated) and such hydrated silicas are produced by a different method, namely, by reaction of dilute sodium silicates with dilute sulfuric acid. Although the products of this latter patent are presently more suitable than those of the aforesaid U.S. Pat. No. 2,739,073 as regards to rubber compounding in particular, various factors involved in their production, including raw material costs, lead to higher product costs. The present invention provides end products which are at least equal in valuable properties to those of the latter patent while being obtainable according to the general and less costly process of the former patent.

A further improvement in the process of this invention arises in connection with the economics of sodium sulfate recovery, this salt being a by-product of the reaction. More specifically, the present process involves the deliberate addition of sodium sulfate as a part of the reaction medium, as a result of which the sulfate wash liquor contains a much higher concentration of sodium sulfate, i.e., the quantity added plus the amount normally produced in the reaction. Since the quantity of water used for washing the reaction products free of sodium sulfate is the same whether sodium sulfate is added or not, the result is that the wash liquor contains a much higher concentration of this salt and is therefore more economical to recover. As will be seen however, the addition of sodium sulfate has significance other than this advantage.

Another advantage of the invention which flows directly from reacting the materials from the inception of the reaction in the presence of sodium sulfate is that the resulting product is more uniform throughout a particular batch. It appears that sodium sulfate has a pronounced effect upon the nature and size of the aggregate, the tendency being toward the formation of smaller aggregates, together with an increase in surface area and oil absorption properties. It is thought possible that this advantage is due basically to the more uniform chemical reaction conditions of the present process in contrast to prior processes. The basic reaction heretofore known produces sodium sulfate. As the reaction proceeds over a period of time, sodium sulfate, starting from zero quantity, builds up to the total amount formed at the conclusion of the reaction. As will be recognized, therefore, the reaction environment is quite different at the beginning as compared with the environment after several minutes, and it constantly changes until complete. By providing a substantial amount of sodium sulfate from the beginning, the effects of this salt are present from the beginning so that a period of time does not exist when the effects are completely absent and there is no period of time when there is less than the optimum amount of the salt. The optimum amount, as well as useful minimum amounts, are a contribution of this invention.

Prior to this invention, it was not thought that the reaction of sodium silicates with aluminum sulfate could be conducted in such a manner as to effect a truly significant change or changes in the nature of the end products, at least as regards to those characteristics important in the art of rubber reinforcing. Thus, the present invention, which demonstrates clearly to the contrary, involves a highly revealing discovery in the art of silica-type pigment production. As is becoming more and more apparent, the chemistry and the chemical nature of the surface of the synthetic silicas and silicates is very complex indeed, and it appears that a considerable amount of additional insight remains to be gained concerning them before they can be considered to be substantially totally understood and evaluated. In the present instance, it is thought to be highly probable that the products obtained are technically rather differently structured chemicals from any heretofore known; yet demonstration of such fact, followed by the provision of a precisely distinguishing definition, is at least very difficult with present day equipment.

As pointed out above, the products of this invention are similar to those heretofore produced following the procedures described in U.S. Pat. No. 2,739,073. In general, these products are compositions essentially consisting of alkali metal, aluminum and silicon oxides, obtained in extremely small particle sizes, as very fine precipitates, by suitable commingling and reacting together, at very low concentrations, dilute aqueous solutions of an alkali metal silicate and a water soluble aluminum salt such as aluminum sulfate, aluminum chloride, aluminum nitrate or ammonium alum. The precipitated pigment particles are substantially all less than one micron in diameter, and they average less than one-half micron in diameter. In the main the particles range from about 0.02 – 0.5 micron. Moreover, they are characterized by extraordinary brightness and by other qualities as hereinafter described which make them exceptionally valuable for uses of the nature indicated above.

One of the most important aspects of the present invention involves the discovery that the basic reaction may be selectively directed to produce specialized forms of sodium silico aluminates. By specialized forms is meant that the present invention permits one to tailor the end product according to the most desirable form for use in a particular environment. Thus, where a reinforcing material for use in rubber shoe soles, heels, and the like of the highest quality is desired, certain overall conditions are found to respond to provide an optimum set of performance characteristics. The present invention provides such products of highly improved character. Moreover, as is well known, the rubber industry not only requires reinforcing materials having very particular performance characteristics, but also the economic aspects of the final rubber producing process must not be affected adversely by the materials added. For example, one may be able to produce a pigment having desired, very fine performance characteristics, but the overall cure time in the rubber process necessitated by such pigment may be longer than a similar pigment having somewhat less acceptable performance characteristics. This heretofore to some extent has led to the compromising of quality of the rubber product in view of the important economic time factor in the production process. The overall cure time is also of importance in other rubber applications, such as in tire production. Accordingly, it is quite important to consider the rubber reinforcing art with the entire requirements in mind.

The aspect of the present invention having to do more particularly with rubber reinforcement in the field of tires, involves several characteristics similar to those required in the shoe field; but certain performance characteristics are required in tires which differ significantly. In other words, the most desirable tire pigment is not necessarily equally suitable in the shoe art. The present invention provides reinforcing material for tires which are tailored to fulfill specific needs and which are superior in performance.

Further, where the pigments are to be employed as fillers in paper making, certain somewhat different characteristics are desirable. Although any of the pigments produced according to this invention may be employed as paper fillers with advantages over previous fillers, those that are produced under certain controlled conditions are more especially desirable because of greater improvement in strike-through performance. This is especially important in low grade paper stock, such as newsprint.

Still further, the pigments produced according to this invention may be employed in the fine paper as paper fillers with certain advantages over previous fillers, some of which are imparting to fine paper a brightness that is at least 0.7 points higher and an opacity that is at least 0.5 points higher than the brightness and opacity values imparted by the sodium alumino silicate produced according to methods generally described in U.S. Pat. No. 2,739,073.

As indicated above, it is not believed that heretofore it has been possible to control the basic reaction in a consistent way such as to effect these relatively delicate modifications of the end products corresponding to improvements for particular uses.

DESCRIPTION OF THE PREFERRED EMBODIMENTS

Although the process of this invention involves a number of conditions which are varied according to particular needs, it has been discovered that a predetermined minimum quantity of sodium sulfate must be present as a part of the reaction medium from the inception of the reaction; otherwise, the end products fail to acquire the physical and surface chemical characteristics falling within the range of pigments which are considered to be of improved nature herein, i.e., an improvement in at least one attribute. (At this point, it may be well to remark that if the general type of reaction is conducted with a different aluminum salt, for example, aluminum chloride, then the corresponding acid salt is required, that is to say, with aluminum chloride one should employ sodium chloride in the reaction.) Continuing, although the sodium sulfate must be present from the beginning of the reaction in a minimum amount, it may be present in quite a large quantity without deleterious effects, at least insofar as the objects of this invention are concerned. The present invention teaches a range of sodium sulfate conditions which produces worthwhile results. It is recognized that if sodium sulfate is present in an unnecessarily large quantity, a reversionary condition sets in and the advantages otherwise produced according to this invention tend to become lost. The exact point of this occurrence is exceedingly difficult to define; and insofar as the point is established quantitatively in this invention, it should be understood that it is established in relation to the performance qualities presently required in the various use areas, and not that a different quantity may produce improved products conforming to a changed standard. As those required performance characteristics may alter in the future, it is foreseen that a greater or an even lesser quantity of sodium sulfate may be tolerable. It is, therefore, desired to emphasize that the discovery of advantageous responsiveness of the basic reaction to sodium sulfate content in relation to a community of products is an extremely important, if not the most important aspect of the present invention. If the sodium sulfate conditions as taught herein are observed in conducting the reaction, an improved product results in at least one important respect which is common to the needs of the rubber industry in the overall and at the same time the pigment has general utility as heretofore known and improved utility in paper making; moreover, the economics of sodium sulfate recovery are afforded.

The aspects of the process within the broad inventive concept as above described which are desirable to be managed for the purpose of producing still other improved characteristics of the end products in relation to special needs are several in number. For example, in order to produce a pigment having properties more suitable for the shoe industry, it is generally more advantageous to perform the reaction by delivering a dilute stream of aluminum sulfate to a pre-established highly dilute sodium silicate - sodium sulfate solution. Thus, the entirety of the sodium silicate and sodium sulfate calculated to be desirable quantity-wise in relation to the aluminum sulfate constitutes a reaction medium to which the aluminum sulfate is fed over a given period of time. As will be more fully described hereinafter, the rate of feed of the aluminum sulfate provides a further means of control upon the nature of the end product. Still further as regards products having special utility in the shoe industry, such products may be obtained by varying the approach to the reaction somewhat from that which has just been described. More particularly, it is found that the reaction may be conducted with the view to obtaining such improved products varying only slightly in character by establishing a sodium silicate-sodium sulfate reaction medium composed of as little as approximately 50 percent of the total of such materials calculated to be necessary in the reaction in relation to the aluminum sulfate, the remainder of the sodium silicate - sodium sulfate solution being fed to the reaction mass as a stream (or streams) concurrently with a separate stream of aluminum sulfate. Here again, some variation of the rate of feed of aluminum sulfate and other process modifications are possible within limits without destruction of desirable qualities of the end product. For example, by feeding a stream of water soluble aluminum salt, more particularly aluminum sulfate, to the reaction medium for at least ten seconds or more in time in excess of the ordinary time generally included within the normal procedure for adding aluminum sulfate to the reaction prior to adding the other reactant, sodium silicate described in U.S. Pat. No. 2,739,073 and in co-pending application No. 730,892 filed May 21, 1968, the resulting product consequently imparts to fine paper improvements in sheet brightness and opacity. Modification of the conditions just described, i.e., manner of commingling the reactants, leads to the production of slightly different products; however, all of the products are improved in one respect or another over those previously known for use in the same environment.

Considering the process from a different standpoint, namely, the standpoint of producing end products having qualities which are especially desirable in the paper industry and tire field, preferably the reaction is conducted in a slightly different manner since the desired differences in the products are significant and demonstrable in use. In this connection, and in contrast to the foregoing approach, it is desirable that the major portions of the reacting materials be fed concurrently as separate streams to a highly dilute sodium silicate-sodium sulfate reaction medium. More especially, a relatively smaller portion of the pre-calculated amounts of sodium silicate and sodium sulfate (usually herein fed as a single combined stream) is employed as the reaction medium, the remainder of such pre-calculated amount constituting the sodium silicate-sodium sulfate feedstream, which is fed simultaneously with a stream of aluminum sulfate. The properties that are produced according to this technique are found to appear increasingly prominently in relation to the smallness of the quantity of sodium silicate-sodium sulfate in the solution which provides the reaction medium. The critical point is in relation to the minimum quantity of sodium sulfate which is desirable to be present initially as a part of the reaction medium. Depending upon the concentration of sodium sulfate in the precalculated feedstream, the exact amount delivered to form the reaction medium will vary. However, for example, in performing the reaction within the preferred conditions herein, approximately 10 percent of the total quantity of silicate and sodium sulfate are employed to constitute the reaction medium to which the remainder of the reactants are delivered over a period of time; and, while still obtaining a product of improved quality for the particular use, as much as approximately 50 percent of the total sodium silicate-sodium sulfate pre-calculated amount may be delivered to form the reaction medium.

Thus, it will be observed that the characteristics of the reaction medium as regards to the quantity of sodium silicate - sodium sulfate content therein in relation to the remainder of the reactants to be fed is a significant variable in the tailoring of specific end products.

As a general proposition, once having determined the quantity of sodium sulfate necessary in the production of a given quantity of end products, regardless of the character of the end products specifically sought, the presence of more or less quantity of the total sodium sulfate in the initial reaction batch is not found to be highly critical; but the minimum quantity of sodium sulfate is always provided at the outset of the reaction. Thus, the sodium sulfate-sodium silicate does not necessarily require to be admixed and fed in as a single stream to provide the reaction medium. Instead, the quantity of sodium sulfate may be fed separately as a stream, or the total, or any part of the total quantity thereof, may be pre-delivered to the water mass in advance of delivery of the reacting chemicals. Moreover, if desired, the sodium sulfate may be fed to the reaction medium with the aluminum sulfate, a minimum quantity of the sodium sulfate having been pre-delivered to the reaction zone.

A further significant aspect of the process concerns the pH of the final pigment end products. In this connection, pigments which are produced by conducting the process within the range of operating techniques above described, and which have improved properties over those heretofore known, have a pH value of from about 7 to 11. Moreover, it has been discovered as a further aspect of the invention that, within this range, pigment pH has a definite relation to the suitability of the pigments for use in the several different environments generally discussed above. More particularly, it has been discovered that when a pigment is produced having a pH within the range of about 7.2 to 8.5, more especially and preferably, within the range of about 7.5 to 8, such pigments exhibit certain characteristics or properties rendering them more useful in paper and in the production of rubber tires. Pigments having a pH within the range of about 7 to 8 are found to exhibit certain characteristics or properties rendering them of improved usefulness in the shoe industry in the production of soles, heels and the like. Therefore, looking to the object of providing the tailor-made products of the present invention, it is an aspect of the invention to control the pH of the ultimate product.

pH control involves particular adjustment to the initial reaction leading to pigment precipitation. Basically, the reaction is conducted such that the final pigment slurry resulting from the reaction falls within particular levels according to the desired ultimate pH of the pigment. In the case of products especially useful in paper and also in reinforcing tire rubber, the reaction is controlled to provide a final slurry pH falling between about 5.5 to 9.5, more particularly and preferably a pH of about 5.8 to 7.0. In the case of pigment production for special utility in the shoe industry, the final slurry may fall within the same pH range, that is to say about 5.5 to 9.5, however, more particularly and preferably, the final slurry pH is controlled such that its pH is about 5.8 to 6.0. As will be understood by those skilled in the art, the final slurry pH is directly related to the sulfate ion content of the slurry and this is readily controlled by adjustment of the quantity of aluminum sulfate which is fed to the reaction. That is to say, since the pH of the final slurry is desired to fall on the acid side, then slightly more aluminum sulfate than needed is provided for reaction with the sodium silicate. Similarly, if a lower slurry pH is desired, a slightly higher quantity of aluminum sulfate is provided. It may be remarked that the higher pH pigments are seen to afford slightly shorter scorch times in the rubber compounding process. On the other hand, as the pigment pH increases towards a higher value, the stiffness quality of the rubber end product begins to degrade slightly.

As will be seen from the foregoing, the desired pigment product pH level is very readily controlled or established by adjusting the reaction medium to the acid side with a slight excess of aluminum sulfate. It is now desired to discuss the matter of pH from another standpoint also having a bearing on the nature of the end products. This additional standpoint has to do with the pH of the reaction medium over the period of time during which the precipitation reaction is taking place. This period of time may be varied widely; however, in general, the reactions extend from approximately 20 to approximately 40 minutes for completion, aside from ageing time before the slurry is filtered. Thus, in discussing precipitation pH, it will be understood that such is in relation to conditions occurring in such periods of time as well as other times which may be adopted for carrying out the precipitation reaction. As aforesaid, it is found that the precipitation pH level exerts a marked effect upon the nature of the particles which make up the final pigment end products. In the case of paper and tire pigments, it is found to be desirable to maintain precipitating pH from about 10.4 to 10.9. In the case of products specialized for use in the shoe industry, it has been found to be desirable to maintain a slightly higher pH, that is from about 10.9 to about 11.3, preferably about 11.2. It should be pointed out that precise pH values are difficult to observe and maintain as a matter of certainty in a given reaction because the permissible deviation from the preferred precipitating pH values is within the limits of error of pH measuring instruments. Therefore, in the present process the reaction conditions are maintained on the basis of pre-established feed rates of the aluminum sulfate. As would be understood, the higher the feed rate for aluminum sulfate, the lower the precipitation pH and vice versa. Of course, where all or a major quantity of the sodium silicate is present in the reaction medium from the outset of the reaction, alum feed rate has very little effect on pH until that quantity is used up in the reaction.

It is perhaps impossible to offer an unequivocal statement concerning the physical or chemical modification which is brought about in the precipitated particles as a result of pH control during the precipitation reaction or as the pH of the ultimate pigment particles is different. However, insofar as observations are believed to permit, it appears that precipitation pH values as indicated, especially the preferred levels, lead to the production of more uniform pigment particles as regards to their size distribution, which uniformity appears to result by way of reduction of the number of coarser particles in the mass. It appears that as the precipitation pH is lower there is produced a larger number of relatively large agglomerated type of pigment particles. Where the precipitation pH is higher, that is within the range preferred herein, the agglomerate structures are smaller; moreover, such pigments are found to have a higher surface area and the agglomerate is less dense.

As regards to the pH of the pigment particle, it is found that higher pH pigments tend to impart a relatively high level of stiffness to the rubber products; and, whereas the opposite is true in pigments of lower pH, the tear resistance of the rubber product is improved. These occurrences are thought to be related to surface chemistry characteristics of the particles, considering such in relation to reactions occurring between the rubber and such pigment surfaces. Further discussion on this point at least at this time, is believed to be entirely theoretical. It is the end result that is accomplished by pigments of the characteristics described herein which are important to note in examining the matter from the standpoint of improved usefulness, the explanation as to why being in any event unnecessary.

As is well known, the general reaction involving sodium silicate and aluminum sulfate may be carried out over a wide temperature range. The presence of the minimum quantity of sodium sulfate throughout the reaction according to this invention requires no particular changes in established temperature conditions. According to this invention, the improved characteristics of the pigments, which affect their increased utility in the rubber compounding processes wherein the scorch time is markedly reduced, result where the reaction as heretofore described is conducted at a temperature within the range of about 70°F to about 180°F or higher, although there is no particular advantage in higher reaction temperatures. All things considered in rendering the reaction more practical, a more suitable temperature range is from about 115°F to about 165°F. Preferably, depending upon exactly how the proces is conducted, the volume and temperature of reaction medium initially established, whether it contain all of the sodium silicate-sodium sulfate solution or only a portion thereof, the aluminum sulfate and sodium silicate streams are adjusted to provide a reaction temperature falling within the range of about 125° to about 150°, preferably about 130° to 140°. In all cases, however, it has been found to be advantageous to feed the aluminum sulfate stream to the reaction at a temperature as high as this range and preferably at a temperature of at least 130° up to about 160°F depending upon the objective. The importance of the aluminum sulfate temperature control is thought to be related to modifications occurring in the surface chemistry of the particles of pigments produced. Specifically, certain of the properties of the pigments of the present invention are thought to occur according to the coordination of aluminum with silica, precipitation of the pigment during the reaction being achieved via aluminum sulfate. It is thought that such precipitation and coordination depend significantly upon the uniform availability of aluminum ions in an acidic media. Such availability itself is related to the dissociation and acidity of the aluminum sulfate, which is temperature related. It may be, therefore, that the recommended temperature control of the aluminum sulfate feed stream leads to the production of pigments having a higher uniformity of surface chemistry characteristic, the reaction environment being such as to afford especially uniform precipitating and surface coordinating conditions. It will be appreciated that such observations may or may not be completely descriptive of circumstances, at least not entirely so, for the reason that a variety of other reaction conditions and relationships are involved. Moreover, the matter of surface chemistry must be regarded as at least somewhat speculative at this stage of knowledge of the art, and especially so where the ultimate properties of the products herein produced are attributed to such phenomena.

Where the objective is to produce pigments intended for application in the shoe industry, as in rubber soles, heels, etc., it has been found to be more suitable and preferable to feed aluminum sulfate at a temperature nearer the upper end of this temperature range, more particularly, about 160°F. The lower end of the temperature range, i.e., about 130°F to about 140°F, has been found to be preferable in producing tire pigments and paper fillers. Insofar as sodium silicate feed temperature is concerned, this is not critical and it may be delivered at room temperature up to the desired reaction temperature.

In practicing the invention, a sodium silicate-sodium sulfate solution is prepared containing the silicate within the range of about 0.50 to 3.0 lbs/gal and sodium sulfate is added thereto in an amount of from 1 to 10 percent by weight of such silicate solution. In general, it is found to be advantageous to increase the sodium sulfate content as the sodium silicate solution is more dilute. Thus, if a relatively dilute sodium silicate solution is prepared, sodium sulfate is supplied in a greater amount, that is to say towards the upper part of the 1 to 10 percent range. Conversely, more concentrated silicate solutions are combined with a lower quantity of sodium sulfate. Where the process is carried out by feeding separate streams of the thus prepared sodium silicate-sodium sulfate solution and the aluminum sulfate solution, as is presently preferred in the production of tire pigments and newspaper pigments especially suitable concentrations for sodium silicate are found to lie within the range of about 1.4 to 1.6 lbs/gal., usually about 1.5 lbs/gal. For this particular sodium silicate concentration, the amount of sodium sulfate supplied is about 5 percent by weight of the sodium silicate solution. Such stream is delivered to a reaction chamber containing a volume of fresh water, such volume being from about 0.4 to about 1.2 gallons of water/lb. of silicate, preferably about 0.6 to 1. Where the objective is to produce pigments especially usable in the shoe industry, in which case preferably the aluminum sulfate is fed directly to the total quantity of sodium silicate-sodium sulfate provided as a further diluted reaction medium, the concentration of the prepared sodium silicate solution is preferably within the range of about 0.6 to 0.8 lbs/gal., usually about 0.70 lbs/gal. Sodium sulfate in this instance is employed on the basis of about 3 percent by weight of the silicate solution.

In the foregoing part of this specification it has been indicated that the approach to conducting the precipitation reaction having particular regard to the commingling of the total quantities of the reactants is subject to a variety of approaches. More particularly, and somewhat in summary, it has been indicated that a reaction medium may be established containing from a very small quantity of each of sodium silicate and sodium sulfate up to the total calculated quantity of such materials to which various reaction media aluminum sulfate is thereafter fed as a substantially constant stream, the commingling taking place with thorough agitation. As will be appreciated, the total quantity of the reactants and the sodium sulfate can be commingled very rapidly or very slowly and, in any case, the precipitation reaction will proceed. Thus, for example, if the object of bringing the reactants together is merely to produce a sodium alumino silicate in the presence of the minimum quantity of sodium sulfate as herein taught, whereby to obtain a product without particular regard to performance characteristics in highly specialized applications, or particular applications not requiring notice of rates of commingling of the reactants, it will be appreciated that one may disregard consideration of such rates. In general, according to this invention, or otherwise, however, it is not found to be advantageous to entirely disregard rates of commingling because of the fact that uniformity of the particulate mass composing the end products is rendered poor or economics are adversely affected. According to this invention it is not seen to be desirable in any instance to attempt to complete the reaction in a shorter period of time than about 3 minutes regardless of the actual sodium silicate-sodium sulfate reaction medium that has been established, that is to say, the amount of the calculated quantity of such materials provided as a dilute medium. Moreover, it may be mentioned that little or no advantage is gained by unduly prolonging the reaction, and therefore, in no instance is it found to be essential to extend the commingling of the reactants beyond a period of about 75 minutes, such times representing the feed time for aluminum sulfate, and also the sodium silicate-sodium sulfate solution in those instances where their total quantities are not provided as the reaction medium for receiving the aluminum sulfate. Therefore, as a practical matter commingling of the reactants should take place within these extremes, i.e., about 3 to 75 minutes. Usually, however, it is not found to be especially suitable to approach either extreme too closely although, depending upon the object of the process, that is to say which product is sought having particular high performance characteristics for specified application such as herein mentioned, it is found that the commingling rates are suitably respectively longer or shorter. A more suitable range for producing pigments of general utility from the standpoint of particle uniformity in such things as particle size, oil absorption and surface area is from about 10 to 50 minutes. More particularly, where the total or a major quantity of the calculated amount of sodium silicate and sodium sulfate is provided as a reaction medium, (such being the preferred approach in producing materials of higher usefulness in shoe soles and the like,) it is preferred to deliver the aluminum sulfate somewhat more rapidly, for example, within a period not greater than about 25 minutes and preferably within about 18 to 20 minutes, sodium silicate and sodium sulfate also being fed to the reaction within such times where the total of such materials is not already present in the reaction medium. Further, where the objective is to produce materials better suited for such as the tire and paper industries, longer commingling times are found to be more desirable. Especially in the case of tire pigment production, wherein it is preferred to provide a reaction medium containing less than 50 percent of the calculated total quantity of sodium silicate and sodium sulfate, as for example 10 percent, it is found to be preferable that the total of the aluminum sulfate and the remaining quantity of sodium silicate-sodium sulfate solution be commingled in the reaction medium by delivering separated streams thereto over a period not less than about 25 minutes, preferably 35–40 minutes. Within these indications, it will be appreciated, that rather precise correlations are necessary with other factors affecting pH of the various reaction media so that the precipitation reaction takes place according to the more desirable pH conditions indicated hereinbefore.

Reference has been made heretofore in this specification to concentrations of sodium silicate and sodium sulfate as well as the desirable degree of dilution provided by the actual reaction medium. It will be appreciated, while bearing in mind that high dilution is desirable in the production of the type of end product sought, (especially overall uniformity of particle character,) that dilution of the reactants as a practical matter may be accomplished by employing very highly dilute stream that are delivered to a reaction medium containing a suitable quantity of relatively concentrated sodium sulfate solution. It also may be remarked that unnecessary dilution merely introduces a water removal problem and otherwise affects economics of the process. Thus, is specifying hereinafter the concentration of aluminum sulfate, it will be understood that such is in relation to the total quantity of water which may be introduced into the process as generally taught and contemplated to be suitable as hereinbefore indicated, other conditions being taken into account. Accordingly, having in mind concentrations which are suitable in relation to the other suitable conditions herein discussed whereby the various products are obtainable, it has been found that the concentration of the aluminum sulfate stream may vary considerably, however, preferably as a practical matter, not less than about 0.1 and not more than about 3.5 lbs/gal. More specifically, and in relation to other conditions indicated to be suitable in connection with products for use in shoe soles and the like, aluminum sulfate concentrations of about 1.2 to about 1.6, specifically about 1.4 lbs/gal. are particularly applicable. On the other hand, a more suitable concentration relative to other suitable conditions for tire reinforcing, paper and the like, is from about 2.2 to 2.8 lbs/gal., more particularly about 2.5 lbs/gal.

In all instances, the quantity of aluminum sulfate actually fed to the precipitation reaction is such as to provide a final slurry having a pH level consistent with the pH of the desired end product.

No special equipment is required in the processes herein described. The reaction vessel itself should be equipped with heating means, for example a steam jacket, in order to maintain the desired reaction temperature; also, it should have adequate agitating means to produce a strong backflow on the body of liquid and thus avoid zones of high concentration of the incoming reactants. It is desirable to bring the reactants together so as to produce an instantaneous reaction of all material being fed to the fullest extent reasonably possible, as such promotes uniformity of the resulting products. Storage vessels equipped with heating means are provided for the reactants, they being connected to the reaction vessel thru lines fitted with flow control means. The reaction vessel is equipped with an outlet line leading to a filter which may be of the rotary-string release type, where the precipitate is water washed to remove sodium sulfate as a liquor, the latter liquor being sent to storage. A portion of this sulfate liquor is utilized in succeeding production as the source of the minimum amount of sodium sulfate needed according to this invention. The filter cake being thixotropic requires to be liquefied and for this purpose a tank is required equipped with a suitable beater. The mass is dried in conventional spray drying equipment.

The immediately following example illustrates detailed procedure and conditions which may suitably be followed in practicing the invention.

EXAMPLE 1

The reaction vessel is charged with 10 gals. of water and a sodium silicate ($Na_2O.2.5\ SiO_2$)-sodium sulfate solution of a silicate concentration of 1.6 lbs/gal. and a sodium sulfate concentration of 5 percent by weight of the silicate is delivered thereto at a rate of 0.196 gpm (gallons per minute) for one minute. The temperature of the resulting reaction solution is established and maintained at 160°F. Alum in concentration of 2.6 lbs/gal. at a temperature of 160°F is delivered to the reaction volume, the agitator being first started, at a rate of 0.066 gal/min. while simultaneously feeding the remaining calculated quantity of the sodium silicate-sodium sulfate solution at its rate of 0.196 gpm. This solution being fed over a time of 38 minutes at which time it is discontinued. Alum flow is continued until the pH of the reaction mass is lowered to 5.9. A setting or digestion period of 15 min. is observed and pH is again measured and readjusted to the 5.9 value, following which it is delivered to the filter where it is washed with water for recovery of sodium sulfate and to reduce its residual content to about 3 percent. The resulting cake, being solid (thixotropic), is delivered to a beater and fluidized after which it is spray dryed at an outlet pigment temperature of about 220°F to a moisture content of 5 percent. The resulting dry pigment has a pH of 8.5 and the mass is composed of extremely fine particles relatively few of which are larger than 0.5 micron.

TABLE

| Example number | 1 | 2 | 3 | 4 |
|---|---|---|---|---|
| Volume of reaction, water/gallons | 10 | 10 | 10 | 10 |
| Silicate feed rate, including Na₂SO₄, gals./min | 0.196 | 0.196 | 0.196 | 0.196 |
| Initial silicate-sulfate feed, time/mins | 1 | 7.8 | 19.5 | 31.2 |
| Silicate-sulfate addition, time/mins | 38 | 31.2 | 19.5 | 7.8 |
| Silicate concentration, lbs./gal | 1.6 | 1.6 | 1.6 | 1.6 |
| Salt concentration in silicate, percent | 5 | 5 | 5 | 5 |
| Alum concentration, lbs./gal | 2.6 | 2.6 | 2.6 | 2.6 |
| Concentration silicate in reactor before alum starts, lbs./gal | 0.03 | 0.20 | 0.44 | 0.61 |
| Alum rate, gal./min | 0.066 | 0.076 | 0.102 | 0.159 |
| Reaction temperature, °F | 160 | 160 | 160 | 160 |
| Alum feed temperature, °F | 130 | 130 | 130 | 130 |
| Final slurry, pH | 5.9 | 5.9 | 5.9 | 5.9 |
| Digestion temperature | 160 | 160 | 160 | 160 |
| Digestion time | 15 | 15 | 15 | 15 |
| Pigment pH | 8.5 | 8.45 | 8.4 | 8.0 |
| Rubber results, shoe soles: | | | | |
| Initial viscosity | 20.8 | 23.0 | 25.7 | 29.5 |
| Minimum viscosity | 18.4 | 19.9 | 22.4 | 24.7 |
| Maximum viscosity | 46.8 | 47.9 | 49.9 | 50.8 |
| Scorch time | 2.04 | 2.34 | 2.50 | 3.16 |
| 8 min. Olsen stiffness | 36.1 | 41.0 | 41.3 | 43.2 |
| 8 min. NBC abrasion | 77 | 78 | 70 | 66 |
| Newsprint results: | | | | |
| TAPPI brightness at 5% loading | 64.9 | 64.6 | 64.4 | 63.9 |
| TAPPI opacity at 5% loading | 88.6 | 87.8 | 86.8 | 86.5 |
| Ink pick up at 5% loading | 2.8 | 3.0 | 3.7 | 3.9 |
| Percent strike thru reduction at 5% loading | 73.8 | 72.0 | 65.4 | 63.6 |
| Percent retention at 5% loading | 69.5 | 59.0 | 57.3 | 53.1 |

TABLE—Continued

| Example number | 5 | 6 | 7 | 8 |
|---|---|---|---|---|
| Volume of reaction, water/gallons | 10 | 5 | 1,800 | 1,800 |
| Silicate feed rate, including Na₂SO₄, gals./min | 0.196 | 0.250 | 30.8 | 35.3 |
| Initial silicate-sulfate feed, time/mins | 39.0 | 4 | 39.0 | 4 |
| Silicate-sulfate addition, time/mins | 0 | 35 | 0 | 35 |
| Silicate concentration, lbs./gal | 1.6 | 2.0 | 1.77 | 1.5 |
| Salt concentration in silicate, percent | 5 | 0.0 | 3.0 | 7.0 |
| Alum concentration, lbs./gal | 2.6 | 2.5 | 1.4 | 2.5 |
| Concentration silicate in reactor before alum starts, lbs./gal | 0.69 | 0.33 | 0.71 | 0.11 |
| Alum rate, gal./min | 0.250 | 0.119 | 19.4 | 15.6 |
| Reaction temperature, °F | 160 | 100 | 140 | 135 |
| Alum feed temperature, °F | 130 | 100 | 160 | 130 |
| Final slurry, pH | 5.9 | 9.0 | 5.9 | 6.9 |
| Digestion temperature | 160 | 100 | 145 | 135 |
| Digestion time | 15 | 15 | 15 | 15 |
| Pigment, pH | 8.5 | | 7.3 | 7.9 |
| Rubber Results, shoe soles: | | | | |
| Initial viscosity | 34.8 | 27.0 | 27.1 | |
| Minimum viscosity | 28.5 | 24.0 | 24.0 | |
| Maximum viscosity | 54.6 | 52.7 | 53.7 | |
| Scorch time | 3.41 | 2.92 | 2.25 | |
| 8 min. Olsen stiffness | 49.9 | 36.8 | 46.3 | |
| 8 min. NBS abrasion | 54 | 60 | 67 | |
| Newsprint results: | | | | |
| TAPPI brightness at 5% loading | 63.7 | 63.9 | | 65.2 |
| TAPPI opacity at 5% loading | 86.5 | 88.4 | | 88.8 |
| Ink pick up at 5% loading | 3.9 | 6.1 | | 2.1 |
| Percent strike thru reduction at 5% loading | 63.6 | 47.0 | | 73.9 |
| Percent retention at 5% loading | 53.1 | | | |

TABLE—Continued

| Example number | 9 | 10 |
|---|---|---|
| Volume of reaction, water/gallons | ¹930 | 920 |
| Silicate feed rate, including Na₂SO₄, gals./min | 31.8 | 31.8 |
| Initial silicate-sulfate feed, time/min | 4 | 4 |
| Silicate-sulfate addition, time/min | 35 | 35 |
| Silicate concentration, lbs./gal | 2.0 | 2.0 |
| Salt concentration in silicate, percent | 7 | 7 |
| Alum concentration, lbs./gal | 2.5 | 2.5 |
| Concentration silicate in reactor before alum starts, lbs./gal | 0.24 | 0.24 |
| Alum rate, gal./min | 18 | 18 |
| Reaction temperature, °F | 140 | 140 |
| Alum feed temperature, °F | 140 | 140 |
| Final slurry, pH | 9.0 | 6.0 |
| Digestion temperature | 140 | 140 |
| Digestion time | 15 | 15 |
| Pigment, pH | 10.2 | 8.1 |
| Rubber results, shoe soles: | | |
| Initial viscosity | | 19.5 |
| Minimum viscosity | | 16.3 |
| Maximum viscosity | | 43.2 |
| Scorch time | | 2.58 |
| 8 min. Olsen stiffness | | 28.4 |
| 8 min. NBS abrasion | | 59 |
| Newsprint results: | | |
| TAPPI brightness at 5% loading | 65.3 | |
| TAPPI opacity at 5% loading | 89.8 | |
| Ink pick up at 5% loading | 3.7 | |
| Percent strike thru reduction at 5% loading | 54.8 | |
| Percent retention at 5% loading | 45 | |

¹ 10% SO₄.

TABLE—Continued

| Example number | 11 | 12 | 13 | 14 |
|---|---|---|---|---|
| Volume of reaction, water/gallons | 255 | 255 | | |
| Silicate feed rate, including Na₂SO₄, gals/min | 5.0 | 5.0 | 6.41 | 6.41 |
| Initial silicate sulfate feed, time/min | 4 | 4 | 39 | 39 |
| Silicate-sulfate addition, time/mins | 35 | 35 | 39 | 39 |
| Silicate concentration, lbs./gal | 2.5 | 1.5 | 1.53 | 1.53 |
| Salt concentration in silicate | 0.78 | 0.72 | 0.23 | |
| Alum concentration, lbs./gal | 2.7 | 2.7 | 1.7 | 1.0 |
| Concentration silicate in reactor before alum starts, lbs./gal | 0.18 | 0.11 | 1.53 | 1.53 |
| Alum rate, gal./min | 3.01 | 1.39 | 3.75 | 2.50 |
| Reaction temperature, °F | 135 | 150 | 150 | 130 |
| Alum feed temperature, °F | 130 | 130 | 150 | 130 |
| Final slurry, pH | 6.0 | 6.0 | 6.0 | 6.9 |
| Digestion temperature | 135 | 150 | 150 | 130 |
| Digestion time | 15 | 15 | 15 | 15 |
| Pigment, pH | 8.0 | 7.3 | 9.6 | 10.1 |
| Rubber results tires (off the road): | | | | |
| Tear at 90 min./cold | 730 | 660 | 615 | 585 |
| Tear at 45 min./hot | 390 | 420 | 340 | 350 |
| Abrasion at 60 min. cure | 72.6 | 62.9 | 91.2 | 96.4 |
| Flexometer (Firestone) 60 min | 263 | 275 | 267 | 272 |
| Scorch time | 19.5 | 19.0 | 17.5 | 19.5 |
| Viscosity | 75 | 78 | 70 | 74 |
| Elongation at 90 min. cure | 550 | 550 | 490 | 500 |
| Hardness at 90 min. cure | 71 | 70 | 69 | 69 |
| Newsprint results: | | | | |
| TAPPI brightness at 4% loading | 64.6 | 64.6 | 63.6 | 63.9 |
| TAPPI opacity at 4% loading | 87.3 | 87.4 | 88.3 | 87.9 |
| Ink pickup at 4% loading | 4.8 | 3.8 | 4.8 | 4.9 |
| Percent strike thru reduction at 4% loading | 65.0 | 72.4 | 57.2 | 56.2 |
| Percent retention at 4% loading | 51.2 | 50.0 | 47.5 | 48.3 |

TABLE—Continued

| Example number | 15 | 16 | 17 | 18 |
|---|---|---|---|---|
| Volume of reaction, water/gallons | 10 | 10 | 10 | 10 |
| Silicate feed rate, including Na₂SO₄, gals./min | 0.196 | 0.196 | 0.196 | 0.196 |
| Initial silicate-sulfate feed, time/mins | 39 | 4 | 39 | 4 |
| Silicate-sulfate addition, time/mins | 0 | 35 | 0 | 35 |
| Silicate concentration, lbs./gal | 0.71 | 1.0 | 0.71 | 1.5 |
| Silicate mol ratio | 3.3 | 3.3 | 2.0 | 2.0 |
| Salt concentration in silicate | 6.0 | 10.0 | 3.0 | 8 |
| Alum concentration, lbs./gal | 1.4 | 2.0 | 1.4 | 2.5 |
| Concentration silicate in reactor before alum starts, lbs./gal | 0.71 | 0.07 | 0.71 | 0.11 |
| Alum rate, gal./min | 0.25 | 0.057 | 0.30 | 0.098 |
| Reaction temperature, °F | 140 | 170 | 140 | 170 |
| Alum feed temperature, °F | 140 | 140 | 140 | 130 |
| Final slurry, pH | 6.0 | 7.0 | 6.0 | 7.0 |
| Digestion temperature | 140 | 170 | 140 | 170 |
| Digestion time | 15 | 15 | 15 | 15 |

EXAMPLE 19

The reaction vessel is charged with 9 gallons of water and a sodium silicate-sodium sulfate solution of a silicate concentration of 2.0 lbs/gal. and a sodium sulfate concentration of 2 percent to 6 percent by weight of the silicate is delivered thereto at a rate of 1162.6 ml/min. The temperature of the resulting reaction solution is established and maintained at 160°F. Alum in concentration of 3.0 lbs/gal. at a temperature of 160°F is delivered to the reaction medium, the agitator being started first, at a rate of 0.09 to 0.11 gpm (gallons per minute) for 10 seconds or more prior to the start of the sodium silicate-sodium sulfate solution at which time the remaining calculated quantity of the sodium silicate-sodium sulfate solution is started at its rate of 1162.6 ml/min. After 25 minutes, the silicate solution is stopped if the slurry pH is above 8.0. The alum is continued until a pH of 7.8 – 8.0 is reached. If the pH is below 8.0, the silicate solution is continued until a pH of 8.0 is reached. A setting or digestion period of 15 minutes is observed and pH is again measured and readjusted to the 7.8 – 8.0 value, following which it is delivered to the filter where it is washed with water for recovery of sodium sulfate and to reduce its residual content to about 3 percent. The resulting cake, being solid (thixotropic), is delivered to a beater and fluidized after which it is spray dried at an outlet pigment temperature of about 220°F to a moisture content of 5 percent. The resulting dry pigment has a pH of 9.5 and the mass is composed of extremely fine particles relatively few of which are larger than 0.5 micron.

Fine Paper Results
TAPPI Brightness at 9 percent loading   89.5
TAPPI Opacity at 9 percent loading   87.8

The following materials, in the quantities indicated, describe a standard testing composition employed to test the exemplary products herein in rubber for use in tires, more particularly heavy-duty tires of the off-the-road type:

| TEST RECIPE — OFF ROAD TIRES | PARTS BY WT. |
|---|---|
| 1. Rubber — (Natural smoked sheets) | 100.0 |
| 2. Carbon Black (ISAF-Intermediate super abrasion carbon black-Huber Corp. Borger, Texas) | 37.0 |
| 3. Pigment (end product of examples 1-18 herein) | 20.0 |
| 4. Zinc Oxide | 5.0 |
| 5. Stearic acid | 3.0 |
| 6. 6-dodecyl-1,2 dihydro-2,4-trimethyl quinoline (Santoflex DD) | 0.5 |
| 7. Polymerized 1.2 dihydro-2,4-trimethyl quinoline (Flextol H) | 1.5 |
| 8 Pine Tar | 5.0 |
| 9. Terpene Resin acid blend (Turgum S) | 2.0 |
| 10. Benzothiozole disulfide (METS) | 0.8 |
| 11. Sulfur | 2.8 |
| Total: | 177.6 |

The following materials, in the quantities indicated, describe a standard testing composition employed to test the exemplary products herein in rubber for use in shoe soles, heels, and the like:

| TEST RECIPE-RUBBER IN SHOE SOLES AND HEELS | PARTS BY WT./100 |
|---|---|
| 1. Styrene-Butadiene Rubber (Plioflex 1778 - SBR, nondiscoloring temperature polymer containing 37 parts light color naphthenic oil per 100 parts cold rubber - Mooney viscosity 42-54) | 42.8 |
| 2. Styrene-Butadiene Rubber (Plioflex 1510 - White, solid low temperature solid cold rubber - Mooney viscosity of 29-36) | 35.0 |
| 3. Styrene-Butadiene Rubber (Plioflex 1950 - White, friable mixture 0f 50% low temperature SBR containing 37 parts of naphthenic oil and 50% high styrene resins) | 93.6 |
| 4. Zinc Oxide | 6.6 |
| 5. ZEOLEX 23 (synthetic pigment material produced according to U. S. patent 2,739,073 as by example 6 herein) | 7.0 |
| 6. Pigment (products of examples 1-5 and 7-18 herein) | 70.0 |
| 7. Stearic acid | 1.0 |
| 8. Carbowax — (Polyglycol - 6000 molecular weight) | 4.0 |
| 9. Phthalic anhydride | .65 |
| 10. NOBS (Special normal - oxydiethylene benzothiazole) | 1.00 |
| 11. Captax (mercaptobenzothiazole) | 0.80 |
| 12. DOTG (diorthotolylgunadine) | 0.80 |
| 13. Octamine (diphenylamine and diisobutylamine) | 1.0 |
| 14. Circo Light Oil (Naphthenic type oil) | 15.0 |
| 15. Sulfur | 2.8 |

Examples 6 and 9 as presented above are illustrative of the best results obtainable following the teachings of U. S. Pat. No. 2,739,073.

In examples 1–14 a sodium silicate of the weight ratio $Na_2O:2.5\ SiO_2$ was employed. Examples 15, 16 and 19 indicate procedures and conditions wherein the silicate weight ratio is according to the formula $Na_2O:3.3\ SiO_2$. Examples 17 and 18 illustrate procedures and conditions wherein the silicate has the ratio of $Na_2O:2.0\ SiO_2$. In Examples 15 to 18 the results obtainable are entirely similar to results obtained in the use of the 2.5 ratio silicate carried out according to this invention.

The invention may be practiced utilizing a wide range of silicates, more particularly within the range of about 1.5 to 3.5 $SiO_2:Na_2O$ by weight.

The test data, respecting initial, minimum and maximum viscosity and also scorch time, was derived utilizing the Monsanto Oscillating-Disk Rheometer.

What is claimed is:

1. Paper products containing papermaking fibers and filler materials produced according to the process of producing materials composed of the oxides of sodium, aluminum and silicon, wherein sodium silicate and a aluminum sulfate are reacted in an aqueous medium following which the resulting precipitate is washed, filtered, dried and recovered in a relatively dry, finely divided state, and wherein the improvement comprises supplying sodium sulfate to said reaction over its course in an amount equal to at least 1 percent by weight based on the weight of said silicate, at least about 0.1 of which sulfate is provided in said aqueous reaction medium from the inception of the reaction.

* * * * *

UNITED STATES PATENT OFFICE
CERTIFICATE OF CORRECTION

Patent No. 3,784,442  Dated January 8, 1974

Inventor(s) Lowell E. Hackbarth and Joseph T. Crockett

It is certified that error appears in the above-identified patent and that said Letters Patent are hereby corrected as shown below:

Column 15, ingredient numbered 6 between lines 20-25:
"quinoline (Santoflex DD)" should be in left column and "0.5" only should be to the right of column.

Column 15, between lines 35-40, ingredient numbered 1:
following "nondiscoloring" the word -- low -- should be inserted.

Column 16, first line:
insert -- ® -- following "Zeolex".

Signed and sealed this 6th day of August 1974.

(SEAL)
Attest:

McCOY M. GIBSON, JR.
Attesting Officer

C. MARSHALL DANN
Commissioner of Patents